United States Patent
Li

(10) Patent No.: US 9,488,856 B2
(45) Date of Patent: Nov. 8, 2016

(54) NARROW BEZEL LCD MODULE AND PLASTIC FRAME THEREOF

(71) Applicant: Shenzhen China Star Optoelectronics Technology Co., Ltd., Shenzhen (CN)

(72) Inventor: Dehua Li, Shenzhen (CN)

(73) Assignee: SHENZHEN CHINA STAR OPTOELECTRONICS TECHNOLOGY CO., LTD., Shenzhen (CN)

(*) Notice: Subject to any disclaimer, the term of this patent is extended or adjusted under 35 U.S.C. 154(b) by 40 days.

(21) Appl. No.: 13/808,585

(22) PCT Filed: Dec. 21, 2012

(86) PCT No.: PCT/CN2012/087113
§ 371 (c)(1),
(2) Date: Jul. 13, 2015

(87) PCT Pub. No.: WO2014/089873
PCT Pub. Date: Jun. 19, 2014

(65) Prior Publication Data
US 2015/0309354 A1 Oct. 29, 2015

(30) Foreign Application Priority Data
Dec. 12, 2012 (CN) .......................... 2012 1 0535058

(51) Int. Cl.
*G02F 1/1333* (2006.01)
*F21V 8/00* (2006.01)
*G02F 1/1335* (2006.01)

(52) U.S. Cl.
CPC ....... *G02F 1/133308* (2013.01); *G02B 6/0088* (2013.01); *G02B 6/0093* (2013.01); *G02F 1/1336* (2013.01); *G02F 2001/13332* (2013.01); *G02F 2001/133314* (2013.01); *G02F 2001/133317* (2013.01)

(58) Field of Classification Search
CPC ..................................................... G02F 1/1333
See application file for complete search history.

(56) References Cited

U.S. PATENT DOCUMENTS

| | | | |
|---|---|---|---|
| 8,319,910 B2* | 11/2012 | Park | G02F 1/133308 349/58 |
| 2006/0028594 A1 | 2/2006 | Chou | |
| 2010/0328571 A1 | 12/2010 | Itaya | |
| 2013/0286319 A1* | 10/2013 | Kuo | G02F 1/133308 349/58 |
| 2014/0063399 A1* | 3/2014 | Kuo | G02F 1/133608 349/58 |

FOREIGN PATENT DOCUMENTS

| | | |
|---|---|---|
| CN | 101261387 A | 9/2008 |
| CN | 102629007 A | 8/2012 |
| JP | 2005079236 A | 3/2005 |

* cited by examiner

*Primary Examiner* — Timothy L Rude
(74) *Attorney, Agent, or Firm* — Mark M. Friedman

(57) ABSTRACT

The present invention provides a narrow bezel LCD module and a plastic frame thereof, the LCD module comprises: a liquid crystal panel; and a backlight module having: at least one optic film; a back plate carrying the optic film; and a plastic frame surrounding the back plate and having at least one fixation structure at two opposite sides thereof, respectively. The fixation structure comprises: an elastic hook engaged with the liquid crystal panel; at least two shoulders protruded from an inner side of the plastic frame to support the liquid crystal panel; and an engagement space formed between the elastic hook and the shoulders to engage with the liquid crystal panel. The present invention can reliably fix the liquid crystal panel and the backlight module to decrease the outer bezel size of the LCD module, so that a LCD device can provide greater viewing angle within a limited space.

14 Claims, 3 Drawing Sheets

NARROW BEZEL LCD MODULE AND PLASTIC FRAME THEREOF

FIELD OF THE INVENTION

The present invention relates to a liquid crystal display (LCD) module, and more particularly to a narrow bezel liquid crystal display (LCD) module and a plastic frame thereof.

BACKGROUND OF THE INVENTION

Liquid crystal display (LCD) devices are the most widely used display device product at present. The LCD device uses liquid crystal layers of the liquid crystal panel to control the light transmittance of each pixel position, so that the LCD devices can correctly display images. Because the liquid crystal panel of the LCD display can not be self-luminous, it needs a backlight module to provide the light source for the liquid crystal panel, and then the LCD device achieves the displaying efficiency. The backlight module has a direct type and edge-light type. The so-called direct-type backlight module is the light source, such as cold-cathode fluorescent lamp (CCFL) or light-emitting diode (LED), arrayed on the back side of the liquid crystal panel and lights emitted by the light source pass through optic films including a light guide plate, a diffuser board, a prism sheet and so on, in order to provide an even surface light. The so-called edge-light type backlight module is the light bar of the LED, disposed to the lateral side of the liquid crystal panel, while the light emits to the light guide plate and then transfers the linear light to an even surface light through the light guide plate.

The LCD device comprises three basic structures, i.e. a liquid crystal panel, a backlight module and a frame, wherein the frame is covered on outer edges of the liquid crystal panel and the backlight module to carry internal components and provide the protection function. Presently, in the development of the LCD device techniques, the narrow bezel design of the LCD device providing greater view angle within a limited space is an appearance innovation of the LCD device. However, how to reliably fix the LCD panel and the backlight module to decrease the outer frame size of the liquid crystal module, even to achieve the appearance being with no bezel is one of the main problems in the techniques of the narrow bezel LCD device.

As a result, it is necessary to provide a narrow bezel light crystal display (LCD) module and a plastic frame to solve the problems existing in the conventional technologies, as described above.

SUMMARY OF THE INVENTION

According to that, the present invention provides a narrow bezel liquid crystal display (LCD) module and a plastic frame thereof to solve the problems existing in the conventional technologies, as described above.

A primary object of the present invention is to provide a narrow bezel liquid crystal display (LCD) module, which uses an elastic hook to reliably fix a liquid crystal panel and a backlight module, so as to easily and quickly complete the assembly for promoting the production efficiency of the narrow bezel LCD module.

Moreover, a secondary object of the present invention is to provide a plastic frame of a narrow bezel liquid crystal display (LCD) module, which is used to narrow the bezel of the LCD module for decreasing the outer bezel size of the LCD module, so that the narrow bezel design of the LCD device can provide greater viewing angle within a limited space.

Additionally, the design of the present invention also can save the front frame component to decrease the component numbers of the narrow bezel LCD module, so as to decrease the production cost of the narrow bezel LCD module.

To achieve the above objects, the present invention of an embodiment provides a narrow bezel liquid crystal display (LCD) module, which comprises:

a liquid crystal panel; and a backlight module, comprising: at least one optic film; a back plate carrying the optic film; and a plastic frame surrounding the back plate, and two opposite sides of the plastic frame having at least one fixation structure, respectively, wherein an elastic hook of the fixation structure and the plastic frame are integrated into one piece, and the fixation structure comprises:

the elastic hook engaged with the liquid crystal panel;

at least two shoulders protruded from an inner side of the plastic frame to support the liquid crystal panel, wherein the at least two shoulders of each of the fixation structure are disposed at two sides of the elastic hook; and an engagement space formed between the elastic hook and the shoulders to engage with and position the liquid crystal panel.

In one embodiment of the present invention, the fixation structures are disposed on two opposite long sides of the plastic frame or two opposite short sides of the plastic frame.

In one embodiment of the present invention, the elastic hooks of the fixation structures disposed on the two opposite sides of the plastic frame have a curved outer guide surface, respectively.

In one embodiment of the present invention, the elastic hook of the fixation structure disposed on one of the two opposite sides of the plastic frame has a curved inner guide surface, and the elastic hook of the fixation structure disposed on the other of the two opposite sides of the plastic frame has a curved outer guide surface.

Furthermore, another embodiment of the present invention provides a narrow bezel liquid crystal display (LCD) module, which comprises:

a liquid crystal panel; and a backlight module which comprises at least one optic film; a back plate carrying the optic film; and a plastic frame surrounding the back plate, and two opposite sides of the plastic frame having at least one fixation structure, respectively, wherein the fixation structure comprises:

an elastic hook engaged with the liquid crystal panel;

at least one shoulder protruded from an inner side of the plastic frame to support the liquid crystal panel; and an engagement space formed between the elastic hook and the shoulders to engage with and position the liquid crystal panel.

In one embodiment of the present invention, the fixation structures are disposed on two opposite long sides of the plastic frame or two opposite short sides of the plastic frame.

In one embodiment of the present invention, the elastic hook of the fixation structure and the plastic frame are integrated into one piece.

In one embodiment of the present invention, the elastic hooks of the fixation structures disposed on the two opposite sides of the plastic frame have a curved outer guide surface, respectively.

In one embodiment of the present invention, the elastic hook of the fixation structure disposed on one of the two opposite sides of the plastic frame has a curved inner guide surface, and the elastic hook of the fixation structure disposed on the other of the two opposite sides of the plastic frame has a curved outer guide surface.

In one embodiment of the present invention, the fixation structure has one of the elastic hooks and at least two of the shoulders.

In one embodiment of the present invention, the at least two shoulders of each of the fixation structure are disposed on two sides of the elastic hook.

Furthermore, further another embodiment of the present invention provides a plastic frame of a narrow bezel LCD module, two opposite sides of the plastic frame having at least one fixation structure, respectively, and the fixation structure comprising:

an elastic hook engaged with a liquid crystal panel;

at least one shoulder protruded from an inner side of the plastic frame to support the liquid crystal panel; and an engagement space formed between the elastic hook and the shoulders to engage with and position the liquid crystal panel.

In one embodiment of the present invention, the elastic hooks of the fixation structures disposed on the two opposite sides of the plastic frame have a curved outer guide surface, respectively.

In one embodiment of the present invention, the elastic hook of the fixation structure disposed on one of the two opposite sides of the plastic frame has a curved inner guide surface, and the elastic hook of the fixation structure disposed on the other of the two opposite sides of the plastic frame has a curved outer guide surface.

To compared with the conventional technique, the narrow bezel LCD module and the plastic frame of the present invention not only can use the elastic hook to reliably fix the liquid crystal panel and the backlight module of the narrow bezel LCD module, to easily and quickly complete the assembly and decrease the outer bezel size of the LCD module, but also can provide greater view angle with a limited space for achieving the object of decreasing the component numbers and the production cost of the LCD module.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The structure and the technical means adopted by the present invention to achieve the above and other objects can be best understood by referring to the following detailed description of the preferred embodiments and the accompanying drawings. Furthermore, directional terms described by the present invention, such as upper, lower, front, back, left, right, inner, outer, side, longitudinal/vertical, transverse/horizontal, and etc., are only directions by referring to the accompanying drawings, and thus the used directional terms are used to describe and understand the present invention, but the present invention is not limited thereto.

Figure 1:
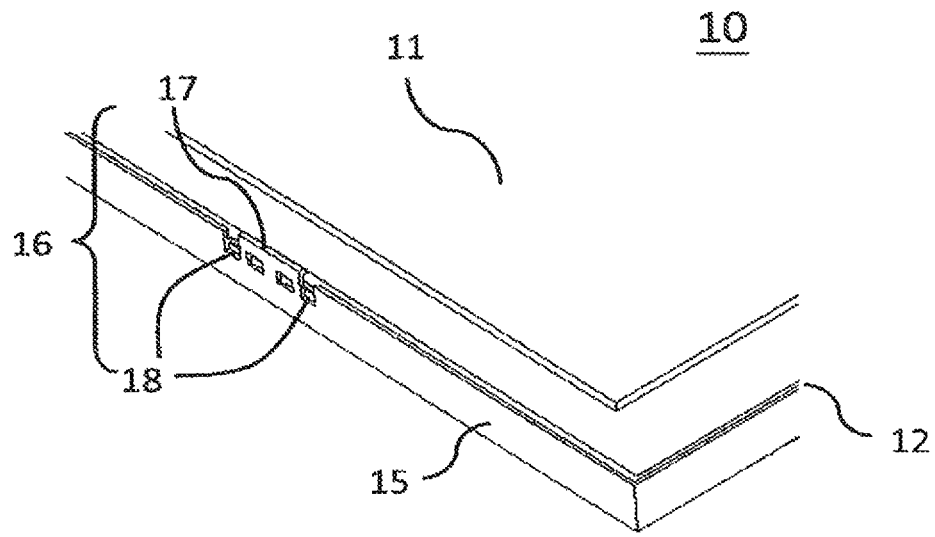
FIG. 1 is an exploded perspective view of a narrow bezel LCD module before assembling a liquid crystal panel according to a first embodiment of the present invention.
Figure 2:
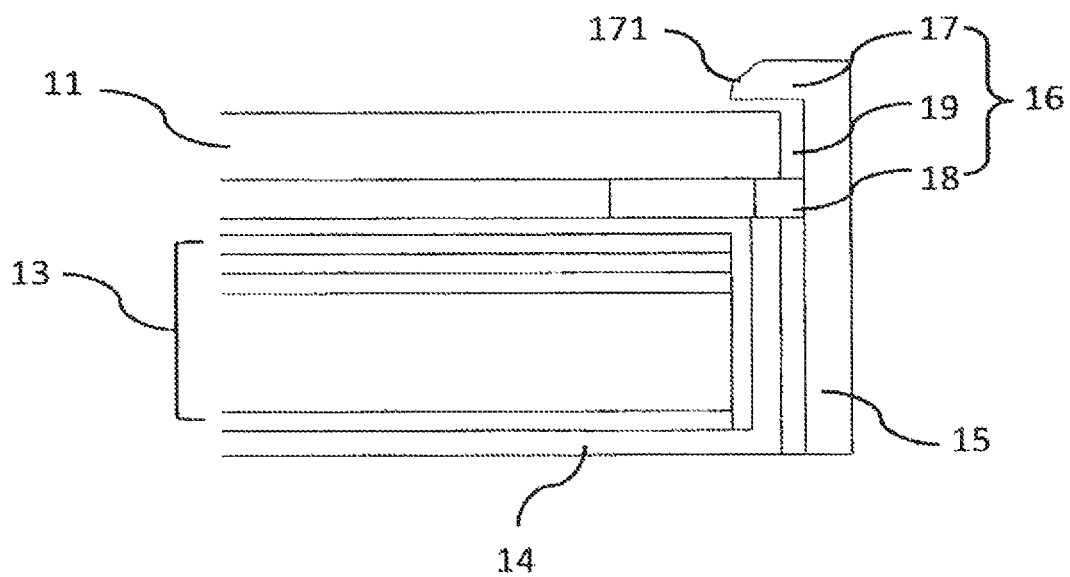
FIG. 2 is an assembled cross-sectional view of the narrow bezel LCD module after assembling the liquid crystal panel according to the first embodiment of the present invention.

Referring now to FIG. 1, a narrow bezel liquid crystal display (LCD) module 10 according to a first embodiment of the present invention is illustrated. As shown, narrow bezel LCD module comprises: a liquid crystal panel 11 and a backlight module 12, wherein the liquid crystal panel 11 can be plastic substrates or glass substrates. Referring to FIG. 2, in the first embodiment of the present invention, the backlight module 12 further comprises: at least one optic films 13, a back plate 14 and a plastic frame 15, wherein the back plate 14 can be a back frame formed by metal stamping, and be used to carry the optic films 13. The plastic frame 15 can be a bezel formed by injection molding of plastic materials, and be used to surround the back plate 14. In the embodiment of the present invention, the optic films 13 comprise various optical films, such as a light guide plate, a diffuser board or the combination thereof, but not limited thereto.

Referring to FIG. 2, in the embodiment of the present invention, two opposite sides of the plastic frame 15 have at least one fixation structure 16, respectively, such as one, two, three and more of the fixation structures 16, but not limited thereto. Additionally, the fixation structures 16, for example, are disposed on two opposite long sides of the plastic frame 15 or two opposite short sides of the plastic frame 15, but not limited thereto. In the embodiment of the present invention, the fixation structure 16 comprises: an elastic hook 17, at least one shoulder 18 and an engagement space 19. The elastic hook 17 is engaged with a front border (edge) of the liquid crystal panel 11; the shoulders 18 is protruded from an inner side of the plastic frame 15 to support a back border of the liquid crystal panel 11; and an engagement space 19 is formed between the elastic hook 17 and the shoulders 18 to engage with and position a lateral surface of the liquid crystal panel 11. Referring to FIG. 2, the elastic hook 17 of the fixation structure 16 and the plastic frame 15 are preferably formed and integrated into one piece by injection molding of plastic materials.

Figure 3:
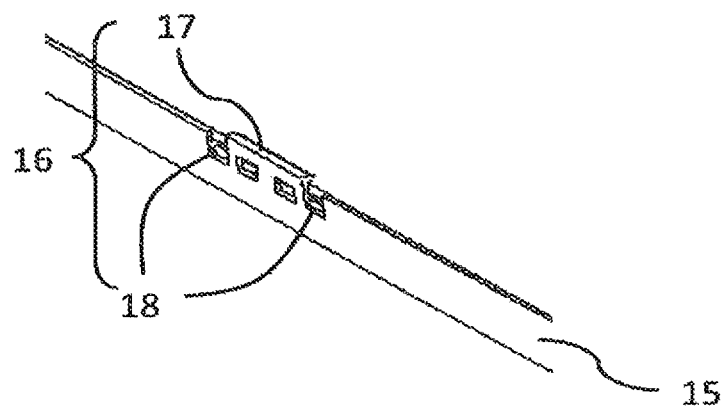
FIG. 3 is a partially enlarged view of the narrow bezel LCD module after assembling the liquid crystal panel according to the first embodiment of the present invention.

Next, referring to FIG. 3, in the narrow bezel LCD module 10 according to the first embodiment of the present invention, each of the fixation structure 16 has the elastic hook 17 and the at least two shoulders 18, and the at least two shoulders 18 of each of the fixation structure 16 are disposed at two sides of the elastic hook 17, and the elastic hook 17 of the fixation structure 16 disposed on the two opposite sides of the plastic frame 15 has a curved outer guide surface 171.

Figure 4:
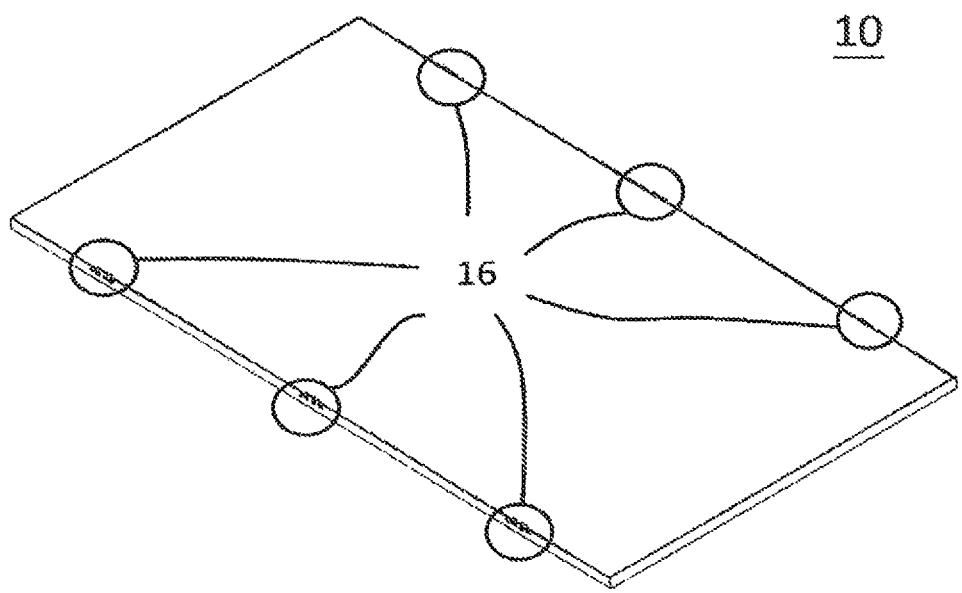
FIG. 4 is an assembled perspective view of the narrow bezel LCD module assembled the liquid crystal panel according to the first embodiment of the present invention.

Referring to FIG. 4, in the first embodiment of the present invention, the assembling method of the narrow bezel LCD module 10 is to horizontally press the liquid crystal panel 11 downward into the plastic frame 15 of the backlight module 12, so that the back border of the two opposite sides of the liquid crystal 11 can simultaneously force a downward pressure to the outer guide surface 171 of the elastic hook 17 at the two opposite sides of the plastic frame 15 to overcome the elastic bias of the elastic hook 17, so that the elastic hook 17 has a temporary and horizontal deformation outward. When the liquid crystal panel 11 totally enters into the plastic frame 15, the lateral surface of the two opposite sides of the liquid crystal panel 11 is immediately engaged and fixed in the engagement space 19. At this time, the shoulder 18 supports the back border of the liquid crystal panel 11, and the elastic hook 17 is horizontally returned inward and elastically engaged with the front border of the liquid crystal panel 11.

Figure 5:
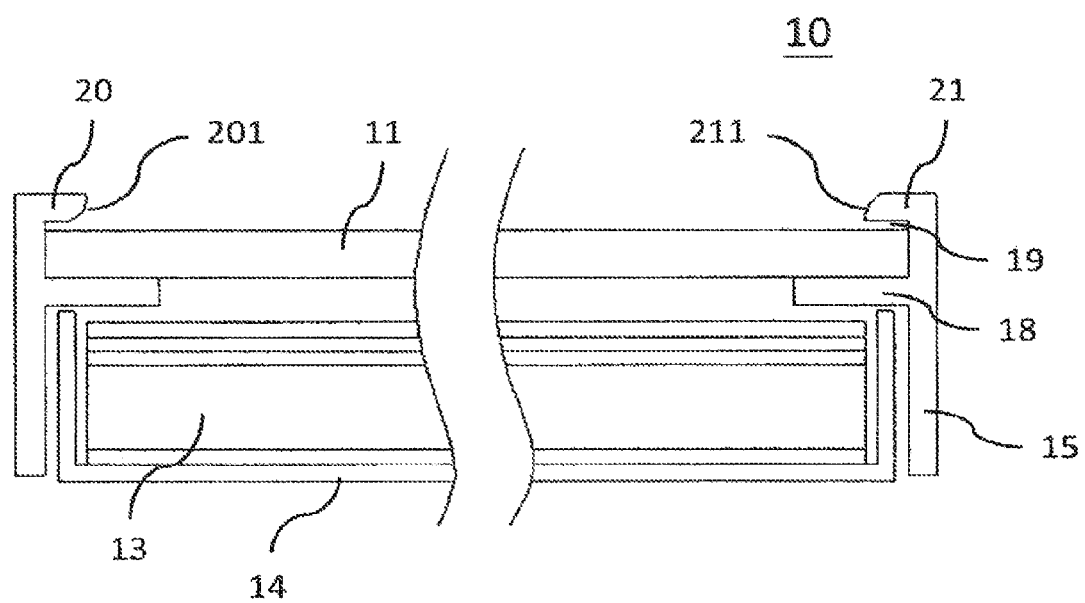
FIG. 5 is an assembled cross-sectional view of the narrow bezel LCD module according to a second embodiment of the present invention.

Referring to FIG. 5, a narrow bezel LCD module 10 according to a second embodiment of the present invention is illustrated and similar to the first embodiment, so that the second embodiment uses similar terms or numerals of the first embodiment. As shown, the difference of the second embodiment is that the elastic hook 17 can be distinguished into at least one first elastic hook 20 and second elastic hook 21, wherein the first elastic hook 20 and the second elastic hook 21 are disposed on the two opposite sides of the plastic frame 15, respectively. In the second embodiment of the present invention, the first elastic hook 20 of the fixation structures 16 is disposed on one side of the plastic frame 15 having a curved inner guide surface 201; and the second elastic hook 21 of the fixation structures 16 is disposed on the other of the two opposite sides of the plastic frame 15 having a curved outer guide surface 211.

Figure 6:
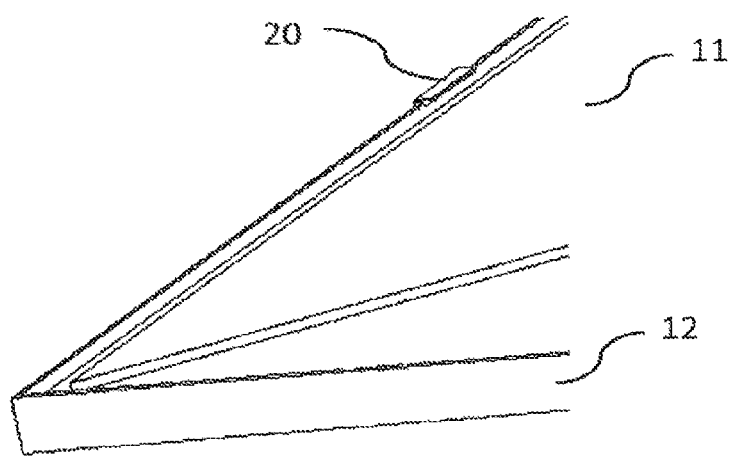
FIG. 6 is an operational view of the narrow bezel LCD module while assembling the liquid crystal panel according to the second embodiment of the present invention.

Therefore, referring to FIG. 6, in the second embodiment of the present invention, the assembling method of the narrow bezel LCD module 10 is to firstly press a lateral surface of one side of the liquid panel 11 along the inner guide surface 201 to engage with the engagement space 19 of the first elastic hook 20, and then the lateral surface of the other side of the liquid crystal panel 11 is downward pressed into the second elastic hook 21. At this time, the back border of this side of the liquid crystal panel 11 forces a downward pressure to the outer guide surface 211 of the second elastic hook 21 to overcome the elastic bias of the second elastic hook 21, so that the second elastic hook 21 has a temporary and horizontal deformation outward. When the liquid crystal panel 11 totally enters into the plastic frame 15, the lateral surface of the two opposite sides of the liquid crystal panel 11 are engaged with and fixed into the engagement space 19. At this time, the second side of the shoulders 18 supports the back border of the same side of the liquid crystal panel 11, and the second elastic hook 21 is horizontal inward returned and elastically engaged with the front border of the liquid crystal panel 11.

As described above, the advantages of the present invention is that the elastic hooks 17,20,21 of the fixation structure 16 have curved guide surfaces 171,201,211 to be pressed or tilted, and thus the liquid crystal panel 11 can inserted therein to assemble with the backlight module 12. Therefore, the narrow bezel LCD module 10 of the present invention is not only simply to quickly complete the assembly, but also can reliably fix the liquid crystal panel and the backlight module, so as to further increase the production efficiency of the narrow bezel LCD module.

It is worth mentioning that, another advantage of the present invention is a design of the plastic frame 15 of the narrow bezel LCD module 10. The structure of the elastic hooks 17,20,21 of the narrow bezel LCD module 10 according to the present invention is simple to be one piece with the plastic frame 15, so as to narrow the bezel of the LCD module and decrease the outer bezel size of the LCD module, so that the narrow bezel design of the LCD device can provide greater viewing angle within a limited space. Additionally, the design of the plastic frame 15 of the narrow bezel LCD module 10 according to the present invention can omit the front frame compounds to decrease the compound numbers of the narrow bezel LCD module, and then it decreases the production cost of the narrow bezel LCD module.

The present invention has been described with relative embodiments thereof and it is understood that many changes and modifications to the described embodiments can be carried out without departing from the scope and the spirit of the invention that is intended to be limited only by the appended claims.

What is claimed is:

1. A narrow bezel liquid crystal display (LCD) module, comprising:
    a liquid crystal panel; and
    a backlight module, comprising: at least one optic film; a back plate carrying the optic film; and a plastic frame surrounding the back plate, and two opposite sides of the plastic frame having at least one fixation structure, respectively, wherein an elastic hook of the fixation structure and the plastic frame are integrated into one piece, and the fixation structure comprises:
    the elastic hook engaged with the liquid crystal panel;
    at least two shoulders protruded from an inner side of the plastic frame to support the liquid crystal panel, wherein the at least two shoulders of each of the fixation structure are disposed at two sides of the elastic hook; and
    an engagement space formed between the elastic hook and the shoulders to engage with and position the liquid crystal panel.

2. The narrow bezel LCD module according to claim 1, wherein the fixation structures are disposed on two opposite long sides of the plastic frame or two opposite short sides of the plastic frame.

3. The narrow bezel LCD module according to claim 1, wherein the elastic hooks of the fixation structures disposed on the two opposite sides of the plastic frame have a curved outer guide surface, respectively.

4. The narrow bezel LCD module according to claim 1, wherein the elastic hook of the fixation structure disposed on one of the two opposite sides of the plastic frame has a curved inner guide surface, and the elastic hook of the fixation structure disposed on the other of the two opposite sides of the plastic frame has a curved outer guide surface.

5. A narrow bezel LCD module, comprising:
    a liquid crystal panel; and
    a backlight module which comprises at least one optic film; a back plate carrying the optic film; and a plastic frame surrounding the back plate, and two opposite sides of the plastic frame having at least one fixation structure, respectively, wherein the fixation structure comprises:
    an elastic hook engaged with the liquid crystal panel;
    at least one shoulder protruded from an inner side of the plastic frame to support the liquid crystal panel; and
    an engagement space formed between the elastic hook and the shoulders to engage with and position the liquid crystal panel.

6. The narrow bezel LCD module according to claim 5, wherein the fixation structures are disposed on two opposite long sides of the plastic frame or two opposite short sides of the plastic frame.

7. The narrow bezel LCD module according to claim 5, wherein the elastic hook of the fixation structure and the plastic frame are integrated into one piece.

8. The narrow bezel LCD module according to claim 5, wherein the elastic hooks of the fixation structures disposed on the two opposite sides of the plastic frame have a curved outer guide surface, respectively.

9. The narrow bezel LCD module according to claim 5, wherein the elastic hook of the fixation structure disposed on one of the two opposite sides of the plastic frame has a curved inner guide surface, and the elastic hook of the fixation structure disposed on the other of the two opposite sides of the plastic frame has a curved outer guide surface.

10. The narrow bezel LCD module according to claim 5, wherein the fixation structure has one of the elastic hooks and at least two of the shoulders.

11. The narrow bezel LCD module according to claim 10, wherein the at least two shoulders of each of the fixation structure are disposed on two sides of the elastic hook.

12. A plastic frame of a narrow bezel LCD module, two opposite sides of the plastic frame having at least one fixation structure, respectively, and the fixation structure comprising:

an elastic hook engaged with a liquid crystal panel;
at least one shoulder protruded from an inner side of the plastic frame to support the liquid crystal panel; and
an engagement space formed between the elastic hook and the shoulders to engage with and position the liquid crystal panel.

13. The plastic frame of the narrow bezel LCD module according to claim 12, wherein the elastic hooks of the fixation structures disposed on the two opposite sides of the plastic frame have a curved outer guide surface, respectively.

14. The plastic frame of the narrow bezel LCD module according to claim 12, wherein the elastic hook of the fixation structure disposed on one of the two opposite sides of the plastic frame has a curved inner guide surface, and the elastic hook of the fixation structure disposed on the other of the two opposite sides of the plastic frame has a curved outer guide surface.

* * * * *